United States Patent
Tanaka (10) Patent No.: US 7,151,871 B2
(45) Date of Patent: Dec. 19, 2006

(54) OPTICAL COMPONENT AND METHOD OF MANUFACTURING THE SAME

(75) Inventor: Hiroyuki Tanaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/043,059

(22) Filed: Jan. 27, 2005

(65) Prior Publication Data

US 2005/0175300 A1    Aug. 11, 2005

(30) Foreign Application Priority Data

Jan. 29, 2004    (JP)    ............................ P2004-020733

(51) Int. Cl.
G02B 6/32    (2006.01)
(52) U.S. Cl. .......................... 385/33; 385/34
(58) Field of Classification Search ................... 385/33, 385/34
See application file for complete search history.

(56) References Cited

FOREIGN PATENT DOCUMENTS

JP         07-281062        10/1995
JP         2002-182073      6/2002

*Primary Examiner*—Sung Pak
*Assistant Examiner*—Tina M. Wong
(74) *Attorney, Agent, or Firm*—Wnitham, Curtis, Christofferson & Cook, PC (57) ABSTRACT

There is disclosed a method of fixedly mounting a graded-index rod lens to a holder easily with high reliability without requiring machining of one end face of the rod lens which is difficult to achieve if the lens has a small diameter. The present invention also offers an optical component having the graded-index rod lens inserted and fixed in a through hole formed in the holder. A part of the through hole on the side of one end face of the rod lens is formed as a tapering hole. A transparent member is molded so as to be tightly fitted with the holder such that the whole end face of the lens and at least a part of the inner surface of the tapering hole are covered with the transparent member. A part of the surface of the transparent member is shaped spherically or aspherically to form a molded lens.

6 Claims, 6 Drawing Sheets

OPTICAL COMPONENT AND METHOD OF MANUFACTURING THE SAME

BACKGROUND OF THE INVENTION

1. Field of the Invention

The present invention relates to an optical component including a holder to which a graded-index rod lens used in the fields of microoptics and optical communications is fixedly mounted.

2. Description of the Related Art

A graded-index rod lens has a capability of refracting light by a refractive index distribution existing in the medium itself and, therefore, the rod lens is fundamentally a cylindrical lens having flat end faces. For this reason, the rod lens shows better geometric matching to other optical elements such as optical fibers compared with general lenses. This is advantageous in making an optical alignment. Furthermore, the medium itself has refractive power and so the focal distance can be varied by varying the lens length. In this way, the rod lens has many excellent characteristics. Consequently, rod lenses of this construction are widely used in the field of microoptics. Also, in the field of optical communications, they are widely recognized as very important optical devices.

In addition, the refractive power of this graded-index rod lens can be increased further by machining at least one end face of the lens into a spherical surface. Thus, a lens which is brighter and has a larger numerical aperture than a lens having flat end faces can be obtained (see Japanese Patent Publication No. JP 2002-182073A, for example).

Other lenses are often mounted to a holder (frame) as well as the aforementioned rod lens, in order that they be handled with ease and be assembled with ease when combined with other optical devices. This is known as mounting to a holder and the following characteristics are important.

Figure 8:
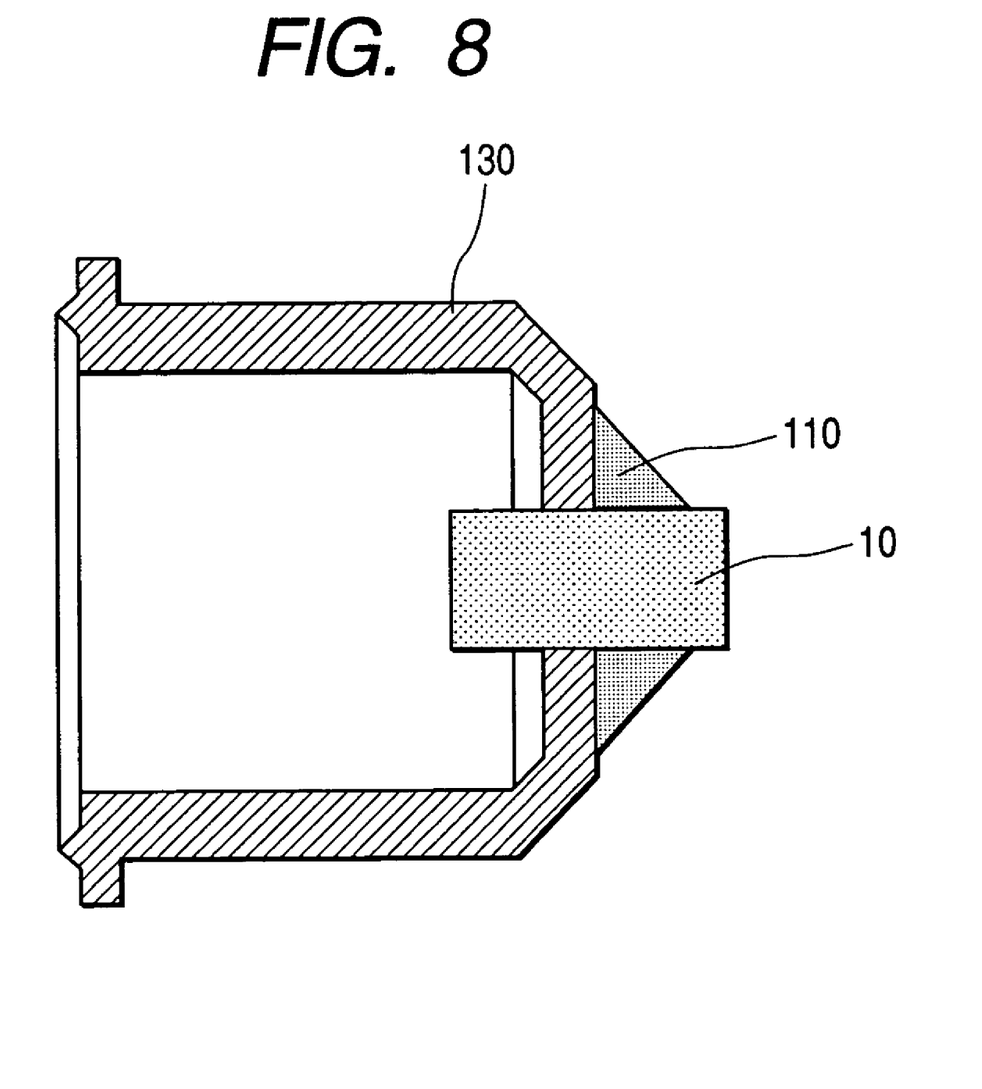
FIG. 8 is a schematic cross-sectional view showing one conventional method of mounting a graded-index rod lens to a lens holder.

(1) The positional accuracy of the lens with respect to the holder
(2) The adhesive strength of the lens to the holder
(3) Airtightness after the holder and lens have been bonded together
(4) Durability of the bonding A method of mounting a rod lens and a semiconductor laser to a holder and integrating them to couple light emerging from the laser to an optical fiber is disclosed, for example, in Japanese Patent Publication JP H07-281062A. Since the diameter of the rod lens is normally as small as several millimeters or less, mounting to the holder is especially important. The holder is made from a metal or resin. The following methods are generally used to fixedly mount the lens to the holder:

(a) Adhesive bonding using metal solder
(b) Adhesive bonding using an organic adhesive
(c) Adhesive bonding using a low-melting-point glass
(d) Press fitting An example of how a rod lens is mounted to a lens holder is shown in FIG. 8. The lens holder, indicated by numeral 130, is made of a metal and assumes a bell-shaped form. The holder has a top portion in which a through hole is formed. The rod lens, indicated by numeral 10, is inserted and fixed in this through hole. In this case, the rod lens 10 is fixedly mounted to the metallic lens holder 130 by low-melting-point glass 110.

However, machining end faces of rod lenses into spherical surfaces suffers from low productivity. Especially, where the diameter of a rod lens is reduced, it becomes more difficult to polish the end faces of the lens.

Furthermore, the above-described means (a)–(d) used in mounting the lens to the holder have the following problems.

In order to bond a glass lens using a metal solder, it is necessary to form a metal film on the outer surface of the lens by metal plating or vacuum film deposition. Furthermore, the holder needs to be plated with gold. Consequently, a large number of processing steps are required. This leads to an increase in the cost.

The method of mounting the lens with an organic adhesive is simple to achieve but the durability has a problem. In addition, if degassing from the resin occurs, depositions are produced on the surface of the lens or the semiconductor optical device is adversely affected.

Generally, bonding using low-melting-point glass is widely known as a method of bonding the window material of a cap (cover) portion of a light-emitting or photodetecting device and provides high durability. However, the low-melting-point glass that is not yet melted is solid and so a machining operation conforming to the profiles of the bonded portions of the holder and lens is necessary. In the example shown in FIG. 8, low-melting-point glass that has been machined into an annular form is used to surround the rod lens. In addition, a care must be paid to the matching among the low-melting-point glass, holder, and lens in terms of coefficient of thermal expansion. In this way, there are many limitations.

Mounting using press fitting is advantageous in that no adhesive medium is required. However, the lens and holder are required to have high dimensional accuracy for the press fitting. Another problem is that press fitting produces internal stress in the glass lens, deteriorating the polarization characteristics.

SUMMARY OF THE INVENTION

The present invention has been made to solve the foregoing problems. It is an object of the invention to provide a method of mounting a rod lens to a holder easily and with high reliability without requiring machining of the face ends of the lens.

An optical component of the present invention consists of a graded-index rod lens that is inserted and fixed in a hole extending through a lens holder. At least one end face of the rod lens is placed in the through hole. A transparent member is tightly fitted with the whole this end face and with at least a part of the inner surface of the through hole. A part of the surface of the transparent member is shaped into a spherical or aspherical form.

Because of this configuration, optical characteristics similar to characteristics that would be obtained when the end faces were machined into spherical surfaces are given to the end faces of the rod lens without machining the end faces. In addition, the rod lens can be fixedly mounted to the lens holder easily and with high reliability and high airtightness.

Preferably, the through hole in the lens holder has a portion of a constant inside diameter and a tapering portion continuous with the portion of the constant inside diameter. The rod lens is mounted to this portion of the constant inside diameter. The transparent member covers the whole end face of the rod lens and at least a part of the inner surface of the tapering portion of the through hole.

The transparent member can be easily molded by tapering a part of the through hole in the lens holder. Also, the intimateness between the transparent member and the lens holder can be enhanced.

Furthermore, an antireflective film, filter for attenuating the strength of transmitted light, or wavelength filter is preferably formed on the surface of the transparent member shaped spherically or aspherically.

After the lens is mounted to the lens holder and the transparent member is molded, the antireflective film or filter can be formed with greater ease than a film formed on a single lens alone.

A holder is molded while the rod lens is held to the holder and the transparent member is kept in tight fitting contact with the holder. A cylindrical portion connected with the through hole in the holder is formed. A semiconductor optical device is inserted and fixed in the cylindrical portion. The semiconductor optical device is hermetically sealed within the cylindrical portion. The distance between the surface of the molded transparent member and the semiconductor optical device is so determined that light emitted or received by the optical device is converged or collimated.

Because of this configuration, an optical component including a combination of any one of various kinds of semiconductor optical devices and a lens can be offered.

The present invention also provides a method of manufacturing an optical component including a graded-index rod lens inserted and fixed in a through hole formed in a lens holder. This method starts with inserting the lens into the through hole in such a way that at least one end face of the lens is placed in the through hole. Then, a transparent member is placed in contact with the end face of the rod lens that is inside the through hole. The transparent member is then heated. Pressure is applied to the transparent member with a molding die to thereby deform the member. The deformed member is pressed against the inner surface of the through hole and with the end face of the rod lens. The surface of the member is shaped spherically or aspherically.

This method makes it possible to impart optical characteristics equivalent to characteristics obtained when the end face of the rod lens is machined into a spherical surface to the rod lens without machining the end face of the lens. At the same time, the rod lens can be mounted to the lens holder easily with high reliability and high airtightness.

According to the present invention, optical characteristics equivalent to characteristics obtained when the end face of the rod lens is machined into a spherical surface can be imparted to the end face of the lens. At the same time, the rod lens can be mounted to the lens holder. Furthermore, formation of an antireflective film or the like can be carried out after the lens is mounted to the holder. Hence, the lens can be easily combined with a semiconductor optical device.

DESCRIPTION OF THE PREFERRED EMBODIMENTS

Preferred embodiments of the present invention are hereinafter described with reference to the drawings.

Figure 1:
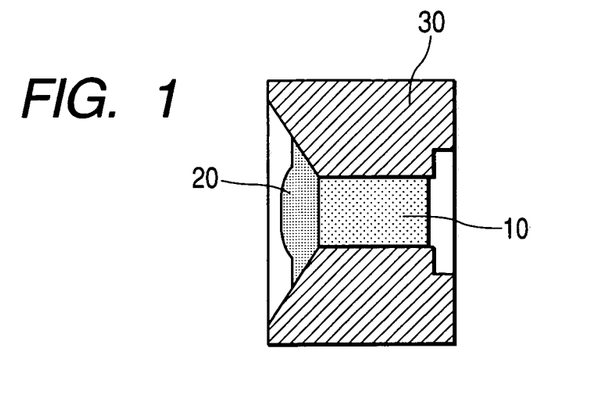
FIG. 1 is a schematic cross-sectional view of an optical component of the present invention.
Figure 3:
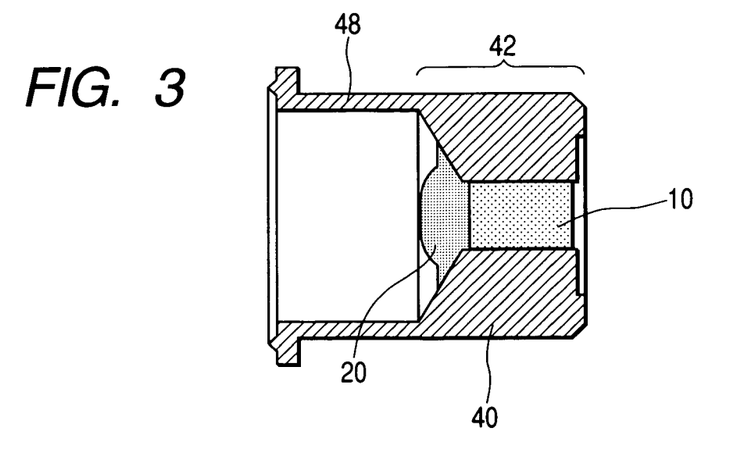
FIG. 3 is a schematic cross-sectional view of another optical component of the invention.

FIGS. 1 and 3 are cross sections through optical components according to embodiments of the present invention.

The optical component of the present invention which is shown in FIG. 1 is manufactured by inserting a graded-index rod lens 10 into a cylindrical through hole in a lens holder 30, holding the lens, and molding a lens 20 in tight fitting with one end face of the lens 10.

Figure 2:
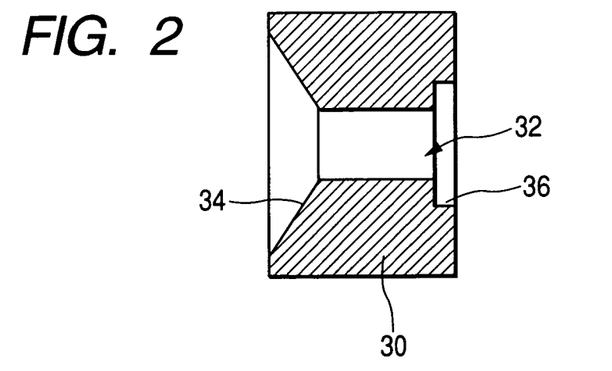
FIG. 2 is a schematic cross section of a lens holder used in an optical component of the invention.

As shown in FIG. 2, the lens holder 30 is provided with the through hole having a central portion including a cylindrical portion 32 having a constant diameter substantially coincident with the diameter of the inserted rod lens. One side of the cylindrical portion is a tapering hole 34. The other side 36 of the cylindrical portion is greater in diameter than the body of the cylindrical portion.

Preferably, the lens holder 30 is so designed that the rod lens 10 passes into the cylindrical portion 32 having both end faces whose inside diameters are constant. In order to implement the present invention, however, it is only necessary that at least one end face with which the molded lens is brought into tight fitting within the through hole in the lens holder 30.

The molded lens 20 is manufactured by heating and molding the transparent material (glass in the present embodiment). During the molding, the lens 20 is pushed into contact with the whole end face of the rod lens 10 and a part of the inner surface of the tapering hole 34 so as to cover them. It is not always necessary that the portion brought into tight fitting with the lens holder be a tapering hole. It suffices that the portion be the inner surface of the through hole. However, the presence of such a tapering hole is preferable because it facilitates the molding.

The surface of the portion of the molded lens 20 through which light rays pass is shaped spherically or aspherically. As a result, the transparent member in tight fitting with the rod lens 10 functions as a lens.

In the embodiment shown in FIG. 3, the portion 42 to which the rod lens 10 and molded lens 20 are held is similar with the structure shown in FIG. 1 except that a cylindrical portion 48 having a large diameter is formed on the molded lens side of the holder 40. This cylindrical portion 48 is formed to accommodate a semiconductor optical device such as a semiconductor laser.

Especially, where it is combined with a semiconductor laser and used, an antireflective film (not shown) is preferably formed on the surface of the molded lens 20. Generally, a dielectric film including one or more layers is formed on the surface of the lens by vacuum film deposition. Where the through hole in the holder is a tapering hole, the film formed on the surface of the lens can be made uniform easily. As the need arises, a filter for attenuating the strength of transmitted light or a wavelength filter may be formed.

The used graded-index rod lens is made of glass. The molded transparent member is also made of glass. The lens holder is made of a metal such as a ferritic stainless steel SF20T. The coefficients of thermal expansion of these components have the following values and the components have been so selected that their coefficients of thermal expansion are almost identical. (See Table 1.)

TABLE 1

| material | coefficient of thermal expansion |
| --- | --- |
| graded-index rod lens | $119 \times 10^{-7}/°$ C. |
| molded glass material | $112 \times 10^{-7}/°$ C. |
| ferritic stainless steel | $122 \times 10^{-7}/°$ C. |

The refractive index of the center of the rod lens and the refractive index of the molded glass material are as follows. Calculationally, the reflectivity at the interface can be set to below 0.1%. (See Table 2.)

TABLE 2

| material | reflectivity |
| --- | --- |
| graded-index rod lens | 1.634 |
| molded glass material | 1.577 |

Figure 4:
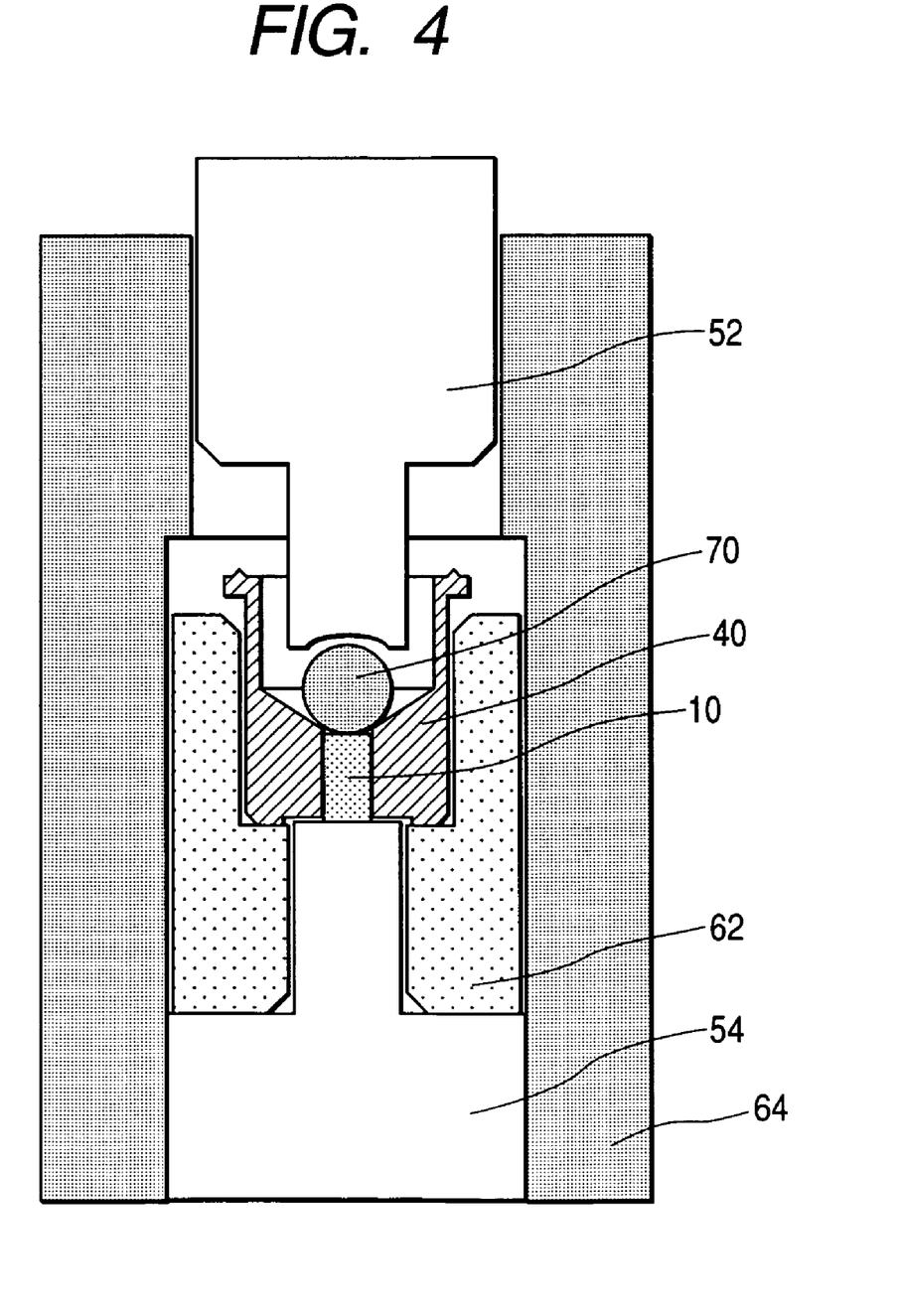
FIG. 4 is a schematic cross section of a molding unit for manufacturing an optical component of the invention.

A method of manufacturing the above-described optical component is next described. FIG. 4 shows a cross section through equipment for manufacturing the optical component of the present invention. In the illustrated state, the optical component shown in FIG. 3 is being manufactured.

An upper mold half 52 for forming the optical surface of the molded lens and a lower mold half 54 for holding the graded-index rod lens 10 are inserted in a cylindrical outer sleeve 64 having a through hole known as a barrel-shaped hole. The coaxialities of the upper and lower mold halves are maintained to such an extent that the molded optical component shows desired optical characteristics. Under this condition, they can move freely axially of the cylinder. As a means for securing the axial positions and coaxialities of the lens holder 40 and graded-index rod lens 10 relative of the lower mold half 54, an inner sleeve 62 is mounted. The sleeve 62 has an inner hole having a step such that the sleeve can be put over the lower mold half. Both lower mold half 54 and outer sleeve 64 are mounted on a base (stationary stage) and fastened in a manner not illustrated.

The lens holder 40 is placed in the space surrounded by the inner sleeve 62 and lower mold half 54 by making use of the step in the inner hole of the inner sleeve. The graded-index rod lens 10 is previously inserted in the through hole in the lens holder 40. A spherical glass material 70 is put into contact with at least one of the tapering hole formed on the outer side of the cylindrical portion of the through hole in the lens holder 40 and the end face of the rod lens. The upper mold half 52 is inserted over the outer sleeve 64 such that the graded-index rod lens 10 and the spherical glass material 70 are sandwiched between the upper mold half 52 and the lower mold half 54. This is used as a molding unit.

Figure 5:
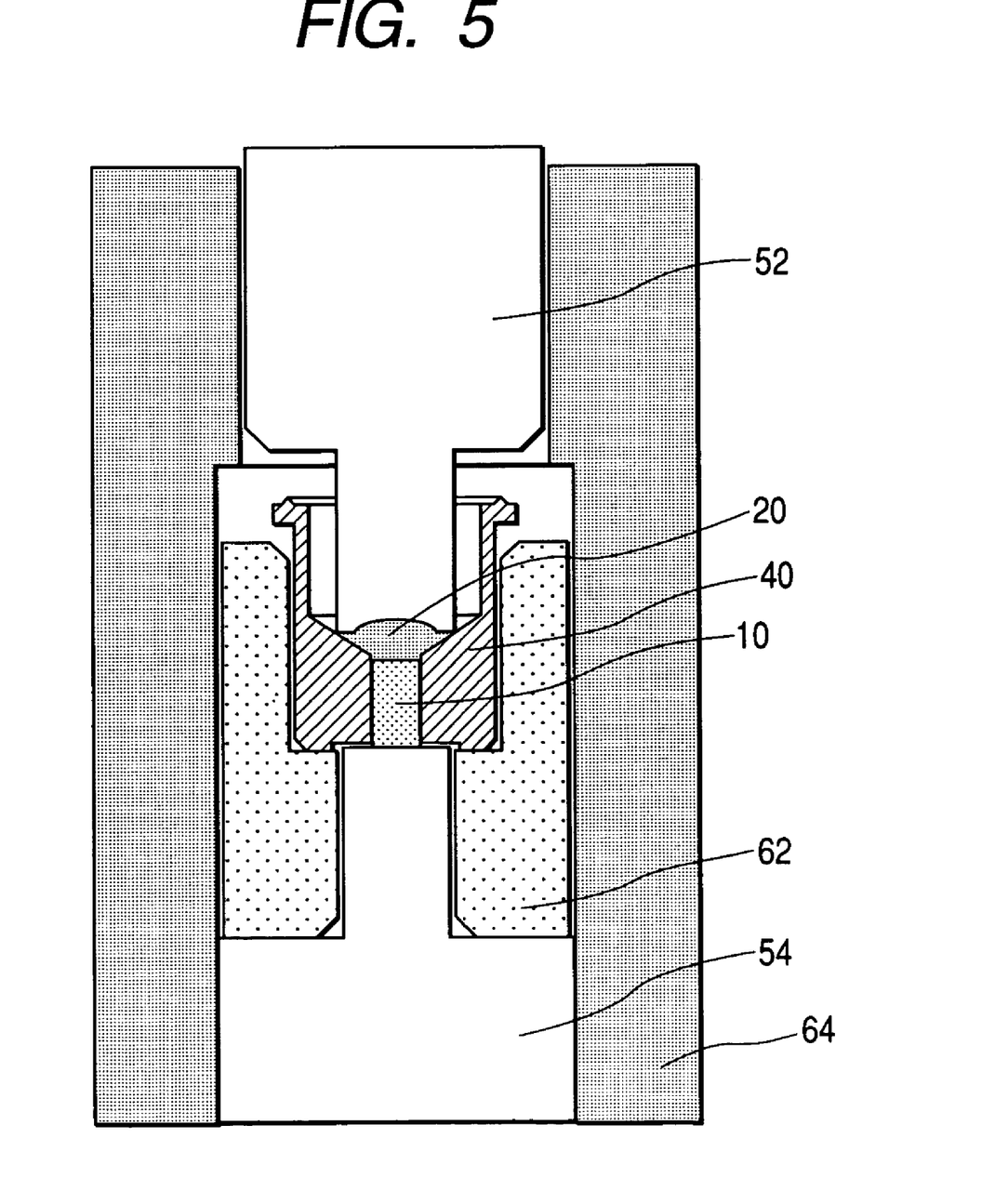
FIG. 5 is a schematic cross-sectional view showing the state of the molding unit after a molding operation.

FIG. 5 is a schematic view showing the manner in which the profile of the molding die is transferred to the glass material by heating the spherical glass material to the neighborhood of the softening point and pushing the upper mold half 52 toward the lower mold half 54. When the glass material is in the neighborhood of the softening point, the material is easily deformed when pushed by the molding die. The molding surface of the upper mold half 52 is transferred, forming the molded lens 20. At the same time, it is pressed toward a part of the inner surface of the tapering hole in the lens holder 40 and toward the end face of the graded-index rod lens 10. The lens is held there. At this time, excess glass is pushed out of the upper mold half 52 and along the inner surface of the tapering hole. Consequently, the region of the lens through which light rays pass is not affected.

The molding process is completed by a given sequence of molding steps. The lens holder to which the lens is held, i.e., the optical component, is taken out after slowly cooling down the molding unit.

An antireflective film or a filter having wavelength dependence is formed on the surface of the lens. In this way, the function is given to the optical component. Since the film on the filter is formed on the lens held to the holder, the operation can be performed with greater ease than where the operation is performed on the rod lens alone.

Figure 6:
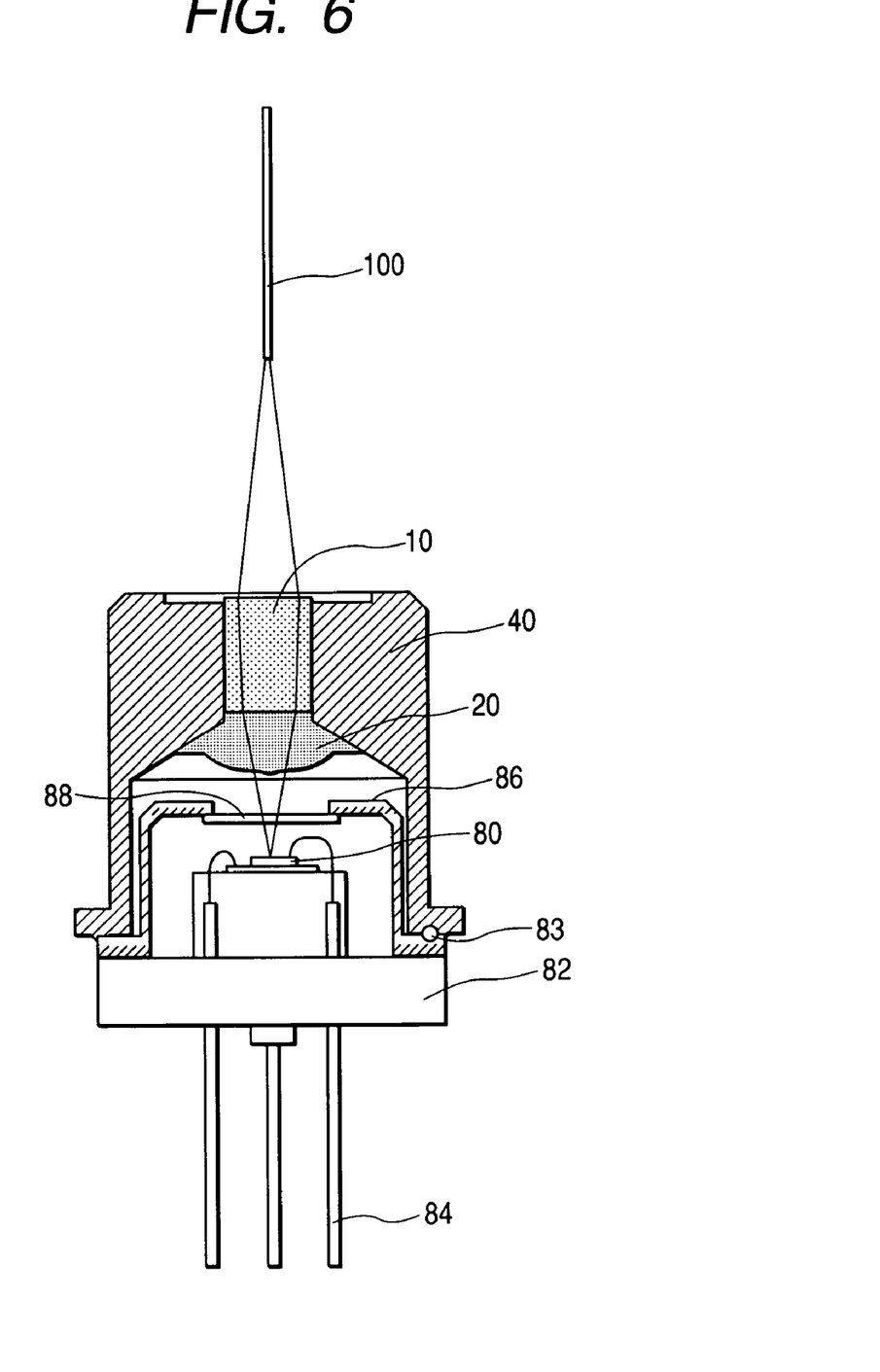
FIG. 6 is a schematic cross-sectional view of a semiconductor laser module according to one embodiment of the present invention.
Figure 7:
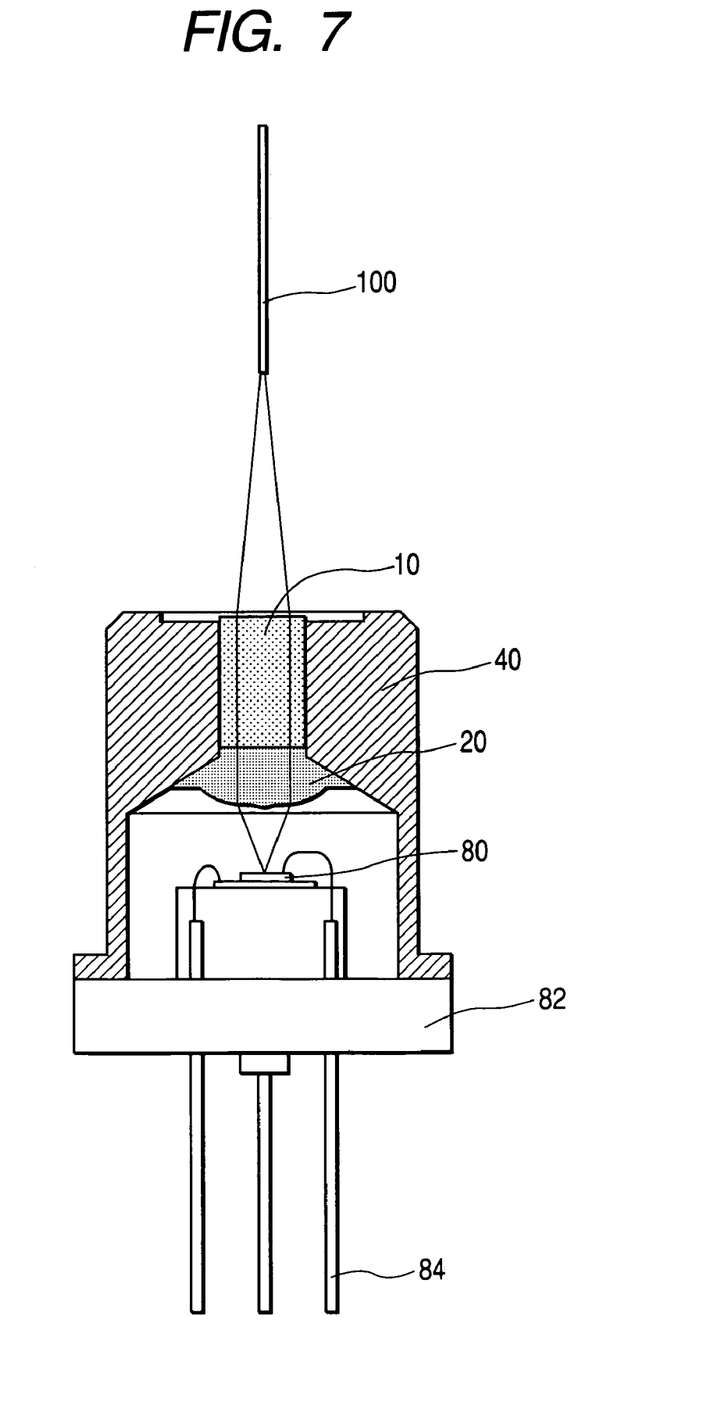
FIG. 7 is a schematic cross-sectional view of another semiconductor laser module according to an embodiment of the invention.

FIGS. 6 and 7 are cross-sectional views of semiconductor laser modules using optical components manufactured as described previously.

FIG. 6 shows an embodiment in which a semiconductor laser device mounted to a container that is generally known as the TO type is used. The semiconductor laser device is manufactured by mounting a semiconductor laser chip 80 on the base 82 of the container, connecting the device electrodes on the chip and lead lines 84 of the container by wire bonding, putting a cap 86 on them, admitting an inert gas into the container, and hermetically sealing off the container.

The portion of the cap 86 of the semiconductor laser device is inserted over the cylindrical portion 48 (see FIG. 5) of the aforementioned optical component as shown in FIG. 6. The end portion of the lens holder 40 of the optical component and the outer peripheral portion 83 of the TO type container are held by solder welding, manufacturing a semiconductor laser module. The lens surface of the molded lens 20 is opposite to the semiconductor laser chip 80 through a glass window 88 of the cap portion 86 of the TO type container.

FIG. 6 shows an embodiment in which no cap is put over the optical component after the semiconductor laser chip 80 is mounted. The lens holder 40 and the base 82 to which the chip has been mounted are directly welded together. In this case, the inside of the lens holder 40 is filled with an inert gas and hermetically sealed off. Since the lens surface of the molded lens 20 is located directly opposite to the semiconductor laser chip 80, the emitting point of the laser and the lens can be placed in proximity to each other.

The semiconductor laser modules shown in FIGS. 6 and 7 have a function of efficiently converging diverging light emitted from the semiconductor laser chip 80 by the molded lens 20 and graded-index rod lens 10 with low aberration and coupling the light into optical fiber 100.

The through hole in the lens holder 40 is formed by machining but has tolerance. Because of the relation of this tolerance to the tolerance of the outside diameter of the rod lens, there is a danger that the airtightness of the portions of the rod lens and lens holder which are bonded together becomes insufficient. In the case of the present invention, however, the presence of the molded lens maintains the airtightness of the inside of the module even if the airtightness between the rod lens and lens holder is insufficient.

In the above embodiments, semiconductor lasers have been described. Where other semiconductor optical device is used, a similar module can be manufactured. Examples of the light-emitting device include light-emitting diode and superluminescent diode. Examples of the photodetecting device include photodiode.

In the description of the embodiments provided so far, rod lens made of glass, molded lens, and metallic lens holder are taken as examples. It is to be noted, however, that the present invention can be applied to other cases. For instance, the rod lens, molded lens, and lens holder can all be made of resin.

What is claimed is:

1. An optical component comprising:
   a graded-index rod lens;
   a holder having a through hole to which the rod lens is fixed; and
   a transparent lens member tightly fitted with the holder, one end face of the rod lens that is disposed in the through hole and a part of inner surface of the through hole;
   wherein a part of a surface of the transparent lens member is shaped spherically or aspherically, and
   wherein the holder is made of metal, and the transparent member is made of transparent glass or polymeric material.

2. The optical component according to claim 1, wherein the through hole in the holder has a constant inside diameter and has a holding portion to which the rod lens is mounted and a tapering portion continuous with the holding portion, and wherein the transparent member covers the whole end face of the rod lens and at least a part of the inner surface of the tapering portion of the through hole.

3. The optical component according to claim 1, wherein an antireflective film is formed on a surface of the transparent member shaped spherically or aspherically.

4. The optical component according to claim 1, wherein a filter for attenuating a strength of transmitted light or wavelength filter is formed on the surface of the transparent member shaped spherically or aspherically.

5. The optical component according to claim 1, wherein
   (a) the rod lens is fixedly mounted,
   (b) a cylindrical portion in which a semiconductor optical device is inserted and fixed is formed, the cylindrical portion being connected with the through hole in the holder which has been molded such that the transparent member is tightly fitted with the holder,
   (c) a semiconductor optical device is hermetically sealed within the cylindrical portion, and
   (d) a distance between the shaped surface of the transparent member and the semiconductor optical device is so determined that light emitted or received by the semiconductor optical device is converged or collimated.

6. A method of manufacturing an optical component having a holder and a graded-index rod lens inserted and fixed in a through hole formed in the holder, the method comprising the steps of:
   inserting the graded-index rod lens into the through hole in the holder such that at least one end face of the lens is in the through hole;
   placing a transparent member in contact with the end face of the rod lens within the through hole;
   heating the transparent member, wherein the holder is made of metal, and the transparent member is made of transparent glass or polymeric material;
   applying pressure to the transparent member using a molding die to deform the transparent member such that the transparent member is pressed against the inner surface of the through hole and with the end face of the rod lens; and
   shaping the surface of the transparent member spherically or aspherically.

* * * * *